United States Patent [19]

Wagner

[11] 4,204,559
[45] May 27, 1980

[54] LINE TAP VALVE

[76] Inventor: Stuart J. Wagner, 19930 NE. 22nd Ct., North Miami Beach, Fla. 33180

[21] Appl. No.: 897,041

[22] Filed: Apr. 17, 1978

[51] Int. Cl.² ............................................. F16K 43/00
[52] U.S. Cl. ...................................... 137/318; 222/83
[58] Field of Search ....................... 137/315, 317, 318; 222/5, 83; 285/197, 198, 199

[56] References Cited

U.S. PATENT DOCUMENTS

| | | | |
|---|---|---|---|
| 2,827,913 | 3/1958 | Wagner | 137/318 |
| 3,198,206 | 8/1965 | O'Brien | 137/318 |
| 3,428,075 | 2/1969 | Wagner | 137/318 |
| 3,548,861 | 12/1970 | Mullins | 137/318 |
| 3,850,192 | 11/1974 | Mullins | 137/318 |
| 3,973,584 | 8/1976 | McKinnon et al. | 137/318 |
| 3,978,881 | 9/1976 | Mouranie | 137/318 |

*Primary Examiner*—Martin P. Schwadron
*Assistant Examiner*—G. L. Walton
*Attorney, Agent, or Firm*—Stoll and Stoll

[57] ABSTRACT

A line tap valve for tapping refrigerant lines of refrigeration and air conditioning systems, said line tap valve having a housing which is adapted to be clamped to a refrigeration line, said housing having two non-aligned but communicating valve bodies or chambers, a line piercing valve in one valve body or chamber and a service valve in the other valve body or chamber, said line piercing valve and said service valve being independently operable, to control the flow into and out of the refrigerant line. The service valve is removable and replaceable without refrigerant leakage when the line piercing valve is in closed position. The line piercing valve is retractable from the refrigerant line to provide an unimpeded flow therethrough when the service valve is in closed condition.

5 Claims, 6 Drawing Figures

LINE TAP VALVE

BACKGROUND OF THE INVENTION

Field of the Invention

This invention relates to refrigeration and air conditioning systems and, more particularly, to servicing same. The present invention is used by refrigeration and air conditioning servicemen in charging and discharging refrigeration and air conditioning systems.

SUMMARY OF THE INVENTION

The principal feature of this invention resides in the use of two separate valves, mounted in two separate but communicating valve bodies or chambers, one valve being adapted to pierce a refrigeration line, the other being adapted to service the refrigeration line through charging or discharging means, both valves being independently operable. When the line piercing valve is in closed position, thereby sealing the refrigeration line, the service valve may be operated or removed or replaced, without affecting the seal applied by the line piercing valve. The line piercing valve may be used with or without the service valve. For example, when a faster charge or discharge rate is desired, the service valve may be removed to provide an unencumbered passage for the refrigerant.

By the same token, the line piercing valve may be operated when the service valve is in closed condition. Thus, the line piercing valve may be retracted from the refrigerant line in order to remove the obstruction of the line piercing needle projecting into the line. Although the refrigerant will now be free to escape through the pierced hole, the service valve will confine the escaped refrigerant to the valve housing. The result is an unrestricted flow through the refrigerant line with no leakage from the valve housing although the line piercing valve is in open position.

DESCRIPTION OF PREFERRED EMBODIMENTS OF THE INVENTION

Figure 1:
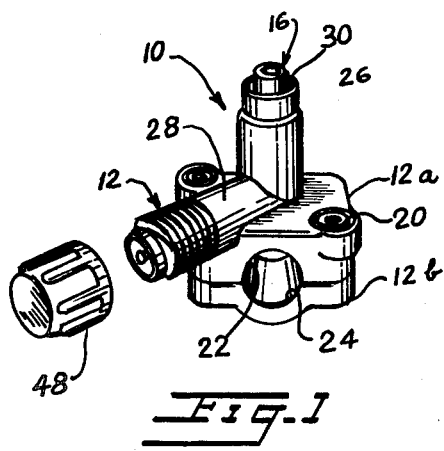
FIG. 1 is a perspective view of a line tap valve made in accordance with this invention.
Figure 2:
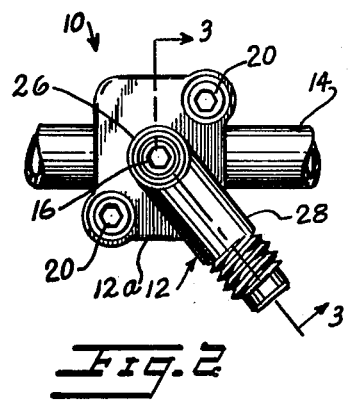
FIG. 2 is a plan view thereof.
Figure 3:
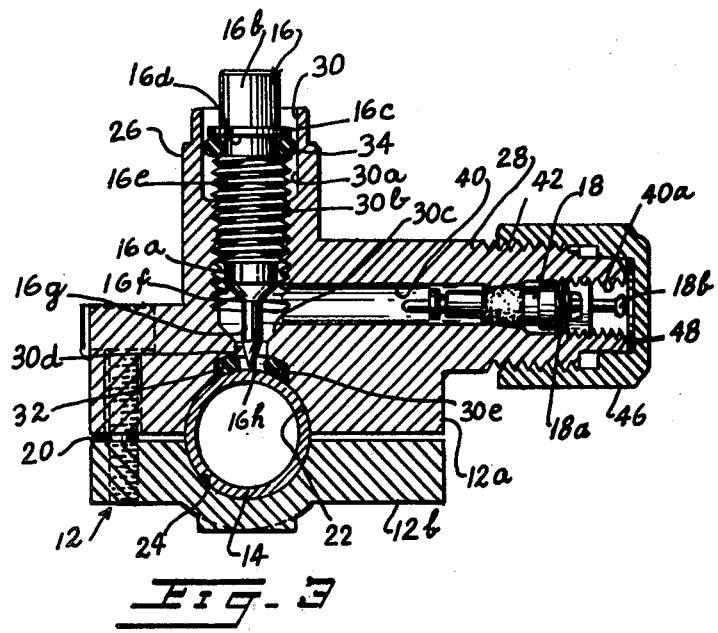
FIG. 3 is an enlarged sectional view of the line 3–3 of FIG. 2, the valve being shown in retracted position preparatory to piercing a refrigerant line.

Referring now to the details of the invention as illustrated in the drawing, and with particular reference to the first embodiment thereof, it will be observed that line tap valve 10 comprises a valve housing 12 which is adapted to be clamped to a refrigerant line 14, a line piercing valve 16 mounted in said valve housing, and a service valve 18 also mounted in said valve housing. Specifically, valve housing 12 comprises two complementary sections 12a and 12b respectively, and a pair of screws 20 is provided to clamp the two sections together around refrigerant line 14. As will be observed, section 12a is provided with a semi-cylindrical socket 22 and section 12b is provided with an opposing semi-cylindrical socket 24, these two sockets being formed to face each other when the two valve housing sections are clamped together to form a cylindrical seat for the refrigerant line 14. It will be observed that screws 20 are socket head screws adapted to receive an Allen-type wrench, but other socket head and slotted head screws may be used in conjunction with appropriate screw-actuating tools.

Sections 12a of the valve housing has a first valve body 26 formed thereon and extending radially with respect to the cylindrical socket which is formed by the combination of semi-cylindrical sockets 22 and 24. A second valve body 28 is also provided on section 12a of the valve housing, said second valve body being disposed in perpendicular relation to the first valve body. In the preferred form of this invention, the two valve bodies 26 and 28 are cast integrally with section 12a of the valve housing.

More particularly, valve body 26 is formed with an axial bore or chamber 30 which communicates at its lower end with socket 22 formed in section 12a of the valve housing. Bore 30 has a relatively large upper end 30a, a diametrically smaller internally threaded intermediate section 30b, a conical shoulder 30c formed at the lower end of said threaded section 30b, a narrow cylindrical neck 30d extending downwardly from said conical shoulder 30c and an enlarged, generally cylindrical recess 30e formed below said narrow neck 30d. It will be noted that a sealing washer 32 occupies said cylindrical recess 30e for engagement with the refrigerant line 14. When the two valve housing sections 12a and 12b are clamped together upon the refrigerant line, said washer 32 is compressed between the refrigerant line and the valve housing to form a leakproof seal. In the preferred form of this invention, washer 32 is a rubber O-ring.

Occupying bore 30 in the first valve body 26 is the line piercing valve 16. This valve comprises a cylindrical shank 16a, a socket head 16b formed at the upper end of said shank, an annular flange 16c formed on said shank below said socket head, an annular groove 16d formed in said shank below said flange 16c, external screw threads 16e formed on said shank below groove 16d, a conical shoulder 16f formed at the lower end of said shank, a reduced neck portion 16g projecting downwardly from said conical shoulder, and a line piercing tip 16h projecting downwardly from said reduced neck portion 16g, said neck 16g and said tip 16h forming the valve needle.

It will be noted that the threaded section 16e of the line piercing valve 16 is engageable with threaded section 30b of the cylindrical wall of bore 30. Socket head 16b is adapted to receive an Allen-type wrench, such as used on clamping screws 20, and when said piercing valve is rotated by means of such Allen wrench, it will be advanced into piercing engagement with the refrigerant line or retracted from engagement therewith. Conical shoulder 16f of the line piercing valve will engage conical shoulder 30c of section 12a of the valve housing and this will provide a leak proof seal between the valve and the housing. It will also be noted that a sealing washer 34 is provided in annular groove 16d of the line piercing valve. This washer, preferably a rubber O-ring, provides a leak proof seal between the shank of the valve and the wall of bore 30.

Referring now to the second valve body 28, it will be seen that it is provided with an axial bore or chamber 40 extending perpendicularly to the axis of bore 30 of the first valve body. Bores 40 and 30 are in communication with each other. Service valve 18 is mounted within bore 40 in the manner shown in the drawing. Specifically, service valve 18 is provided with an enlarged outer section 18a having external screw threads which are engageable with the threaded section 40a of bore 40. Service valve 18, in the preferred form of this invention, is an air core type of valve commonly sold under the trademark Schrader and used in automobile and bicycle tires. This type valve may be threaded into and out of threaded section 40a, as desired. For example, should it be desired to replace this valve with another of the same kind, or should it be desired to operate the entire unit without a service valve, the valve may readily be removed. Valve 16 will then perform the functions of a service valve.

It will be noted and understood that valve 18 is provided with a spring biased axial stem 18b. This stem is engageable by a conventional depressor type charging hose which may be threaded to externally threaded portion 42 of the second valve body. This type of charging hose contains means for engaging stem 18b and when said stem is thrust inwardly it causes the valve to open. This valve will automatically close (stem 18b being spring urged and also subject to outward refrigerant pressure).

The following is the procedure for using the valve hereinabove described. The valve housing is clamped onto refrigerant line 14 in the manner set forth. Valve 16 is then operated by means of an Allen-type wrench and it is advanced inwardly until its piercing needle pierces and penetrates the wall of the refrigerant line. At this point although a hole is formed, it is also sealed since the piercing needle occupies the hole. To charge or discharge the refrigeration system, as the case may be, a charging hose is secured to the second valve body 28 in the manner described and since this hose is provided with means for depressing valve stem 18b of the service valve, this valve will now be opened. There still is no flow of refrigerant in either direction through the pierced hole in the refrigerant line. However, this hole may now be opened by retracting the piercing needle. Since the two bores 30 and 40 are in communication with each other, there will be a flow of refrigerant in one direction or the other through the two bores and the pierced hole in the refrigerant line. At the conclusion of the charging or discharging operation, as the case may be, the piercing needle will be again advanced into the pierced hole in order to seal that hole. Also, as has above been stated, the conical section 16f of the piercing valve will engage the conical section 30c of bore 30 and a seal will be effected between the two conical sections. When the charging hose is removed from the second valve body, valve stem 18b will be thrust outwardly to close the service valve. If desired, the charging hose may be replaced on the second valve body by a threaded cap 46 having a washer insert 48. This will provide a further seal against leaks.

Figure 5:
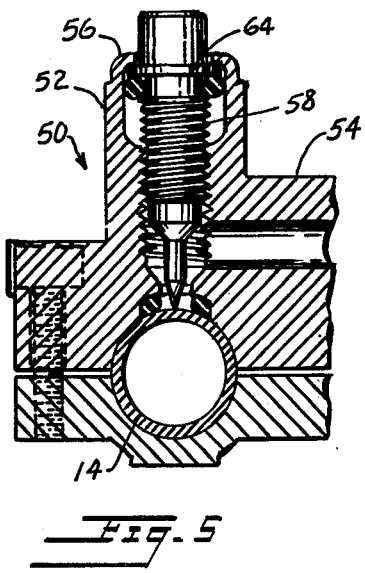
FIG. 5 is a view similar to that of FIG. 3, but showing a modified form of the invention.
Figure 4:
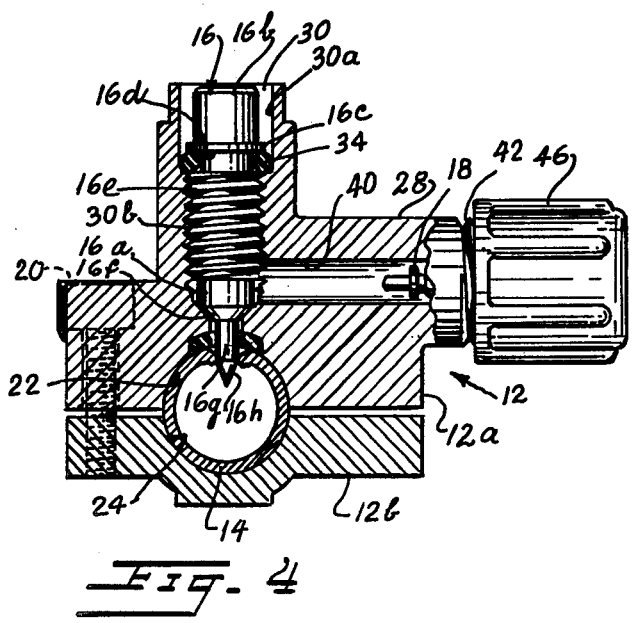
FIG. 4 is a view similar to that of FIG. 3, but showing the valve in operative position and showing the refrigerant line pierced.
Figure 6:
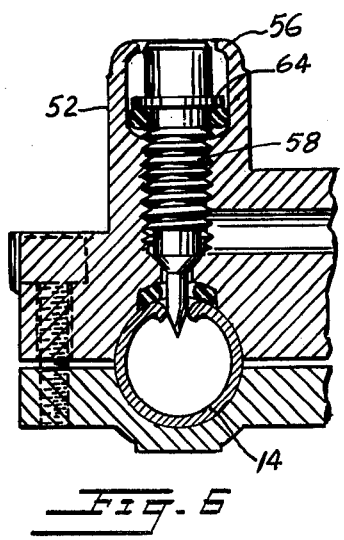
FIG. 6 is a view similar to that of FIG. 4, but showing said modified form of the invention.

Turning now to the modified form of the invention as illustrated in FIGS. 5 and 6 of the drawing, it will be understood that line tap valve 50 corresponds to line tap valve 10 except in the use of an annular rim 56 which extends radially outwardly at the upper end of valve body 52 of valve housing 54. More specifically, the upper end of said valve body is crimped radially inwardly to form said annular rim. It will be understood that the principal function of annular rim 56 is to prevent accidental dislodgment of the line piercing valve 58 from the valve body. FIG. 5 shows the uppermost position of line piercing valve 58 wherein annular flange 64 is in engagement with annular rim 56 to prevent further outward movement of the line piercing valve 58. FIG. 6 shows said line piercing valve 58 in its lowermost position in valve body 52 and it will be observed that annular flange 56 in no way interferes with movement of said line piercing valve to said lowermost position.

The foregoing describes preferred embodiments of the invention, and it will be understood that these embodiments are intended to illustrate and not to limit the invention, except as limitations are delineated in the appended claims. For example, the invention is not limited to the precise shape of parts or relative proportions shown in the drawing. Nor is it limited to the precise O-ring washers ans socket screws shown in the drawing.

I claim:

1. A line tap valve for tapping refrigerant lines of refrigeration and air conditioning systems, said line tap valve comprising:
   (a) a valve housing adapted to be clamped about a refrigeration line,
   (b) said valve housing including a first valve body which extends radially of such refrigeration line,
   (c) said valve housing including a second valve body which extends radially of the first valve body,
   (d) communicating bores formed in said first and second valve bodies,
   (e) a line piercing valve mounted in the bore formed in the first valve body for piercing engagement with the refrigeration line, to form a pierced hole therein,
   (f) said line piercing valve being adapted to open the pierced hole when backed away therefrom, thereby opening the pierced refrigeration line to said communicating bores, and being adapted to close said pierced hole when reinserted therein, thereby resealing said pierced refrigeration line,
   (g) a service valve mounted in the bore formed in the second valve body for engagement with a service hose having valve actuating means,
   (h) said line piercing valve and said service valve being independently operable,
   (i) said line piercing valve having a valve stem with external screw threads formed thereon,
   (j) a valve head formed at the upper end of said valve stem, said valve head having a tool engageable configuration,
   (k) a piercing needle provided at the lower end of said valve stem,
   (l) the bore in the first valve body having internal screw threads formed therein for engagement with the external screw threads of the valve stem,
   (m) whereby the piercing needle is caused to advance or retract relative to the refrigeration line when the line piercing valve is rotated by means of a tool engaging the valve head,
   (n) said service valve being removably secured to the second valve body,
   (o) said service valve further being provided with external screw threads, and the bore in the second valve body being provided with complementary internal screw threads, whereby the service valve is adapted to be threaded into and out of said threaded bore in the second valve body, and (p) whereby said service valve may be removed from said second valve body when said line piercing valve is closed, said service valve, when in place, providing flow out of said second valve body thereby enabling said piercing valve to be retracted from said line to avoid flow obstruction therein.

2. A line tap valve in accordance with claim 1, wherein
   (a) an external conical shoulder is formed on the valve stem between the piercing needle and the external screw threads,
   (b) a complementary internal conical shoulder being formed in the bore in the first valve body below the internal screw threads,
   (c) whereby advancing the line piercing valve causes said external conical shoulder to engage said internal conical shoulder to close the valve.

3. A line tap valve in accordance with claim 2, wherein:
   (a) a first annular sealing washer is provided between the valve housing and the refrigeration line, and
   (b) a second annular sealing washer is provided between the valve stem and the wall of the bore in the first valve body,
   (c) whereby the first annular sealing washer provides a seal between the valve housing and the refrigeration line, and the second annular sealing washer provides a seal between the valve housing and the line piercing valve.

4. A line tap valve in accordance with claim 3, wherein:
   (a) an annular groove is formed on the valve stem between the valve head and the external screw threads,
   (b) said second annular sealing washer being held within said annular groove for integral movement with the line piercing valve when said valve is advanced or retracted,
   (c) said second annular sealing washer extending radially outwardly from said annular groove for sealing engagement with the base wall in the first valve body.

5. A line tap valve in accordance with claim 3, wherein:
   (a) an annular flange is formed on the valve stem below the valve head, and
   (b) an annular rim is formed at the upper end of the first valve body,
   (c) said annular flange extending radially outwardly, said annular rim extending radially inwardly,
   (d) whereby the annular flange is engageable with the annular rim to prevent accidental dislodgement of the valve stem from the first valve body.

* * * * *